US012604363B2

(12) United States Patent
Leng et al.

(10) Patent No.: US 12,604,363 B2
(45) Date of Patent: Apr. 14, 2026

(54) SIDELINK COMMUNICATION METHOD AND COMMUNICATION DEVICE

(71) Applicant: GUANGDONG OPPO MOBILE TELECOMMUNICATIONS CORP., LTD., Dongguan (CN)

(72) Inventors: Bingxue Leng, Dongguan (CN); Qianxi Lu, Dongguan (CN); Zhongda Du, Dongguan (CN); Shichang Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 359 days.

(21) Appl. No.: 18/474,437

(22) Filed: Sep. 26, 2023

(65) Prior Publication Data

US 2024/0015846 A1    Jan. 11, 2024

Related U.S. Application Data

(63) Continuation of application No. PCT/CN2021/084688, filed on Mar. 31, 2021.

(51) Int. Cl.
*H04W 76/28* (2018.01)
*H04W 28/26* (2009.01)
(Continued)

(52) U.S. Cl.
CPC ........... *H04W 76/28* (2018.02); *H04W 28/26* (2013.01); *H04W 72/0446* (2013.01); *H04W 72/0453* (2013.01)

(58) Field of Classification Search
CPC . H04W 76/28; H04W 28/26; H04W 72/0446; H04W 72/0453; H04W 92/18;
(Continued)

(56) References Cited

U.S. PATENT DOCUMENTS

| | | | |
|---|---|---|---|
| 2023/0007727 A1* | 1/2023 | Fan | H04L 1/1896 |
| 2023/0063472 A1* | 3/2023 | Freda | H04W 52/0274 |
| 2023/0084999 A1* | 3/2023 | Selvanesan | H04W 52/0216 |
| | | | 370/329 |

FOREIGN PATENT DOCUMENTS

| | | | |
|---|---|---|---|
| CN | 111148236 A | 5/2020 | |
| EP | 3614774 A1 * | 2/2020 | H04W 72/20 |

(Continued)

OTHER PUBLICATIONS

TS 38.321, V16.3.0; 3GPP TS, Jan. 6, 2021; Section 5.7 of 38.321 provides a detailed introduction to Uu port DRX, including DRX configuration parameters, DRX activation conditions, etc; Section 5.22 of 38.321 provides a detailed description of the transmission process of the contralateral link, including transmission behavior and resource acquisition behavior. Based on the above background, the present invention provides a UE wake-up strategy in the side link energy-saving system.

(Continued)

*Primary Examiner* — Vinncelas Louis
(74) *Attorney, Agent, or Firm* — Ladas & Parry LLP

(57) ABSTRACT

Provided in the embodiments of the present disclosure are a sidelink communication method and a communication device. The method includes transmitting, by a first terminal device, assistance information to a second terminal device in a first time interval, wherein the assistance information is configured to indicate a resource set, and the resource set comprises one or more of: a resource preferred by the first terminal device, a resource not preferred by the first terminal device or a conflicting resource; wherein the first time interval is in an active time of a discontinous reception (DRX) operation of the second terminal device.

18 Claims, 5 Drawing Sheets

300

Terminal device A

Terminal device B

S310, transmitting assistance information

S320, transmitting data on a third time-frequency resource

(51) Int. Cl.
  H04W 72/0446    (2023.01)
  H04W 72/0453    (2023.01)

(58) Field of Classification Search
  CPC ..... H04W 72/25; H04W 72/02; H04W 76/14;
          H04W 52/0216; H04W 52/0274; H04W
          72/04; H04W 72/56; H04W 72/20; H04L
                                          1/1896
  See application file for complete search history.

(56) References Cited

FOREIGN PATENT DOCUMENTS

| | | | | | |
|---|---|---|---|---|---|
| WO | 2020154866 | A1 | 8/2020 | | |
| WO | 2021016979 | A1 | 2/2021 | | |
| WO | WO-2022027588 | A1 * | 2/2022 | ............ | H04W 72/56 |
| WO | WO-2022077519 | A1 * | 4/2022 | ............ | H04W 72/04 |

OTHER PUBLICATIONS

TS 38.331, V16.3.1; 3GPP TS, Jan. 7, 2021; Section 5.8.8 of 38.331 introduces the use of configuration resources by UE in network configuration, and the autonomous selection of resources for side link transmission.

TS 38.214, V16.4.0; 3GPP TS, Jan. 8, 2021; Section 8.1.4 of 38.214 introduces the resource exclusion steps for UE in side link transmission under autonomous resource selection.

Mediatek Inc. On SL Resource Allocation Enhancements 3GPP TSG-RAN WG2 Meeting # 112 Electronic, R2-2010333, 23.10. 2020 (Oct. 23, 2020), Section 2.

Lenovo et al. Discussion on Sidelink Resource Allocation Enhancements 3GPP TSG-RAN WG2 Meeting # 113 Electronic, R2-2101116, May 2021 (Jan. 15, 2021), Section 2.

International Search Report and Written Opinion, International Application No. PCT /CN2021/084688, mailed Sep. 26, 2021 (13 pages).

* cited by examiner

<u>100</u>

SL resource granted          SL resource granted

101

SL commuiniction 102                                    103

<u>200</u>

201

SL communication 202          203

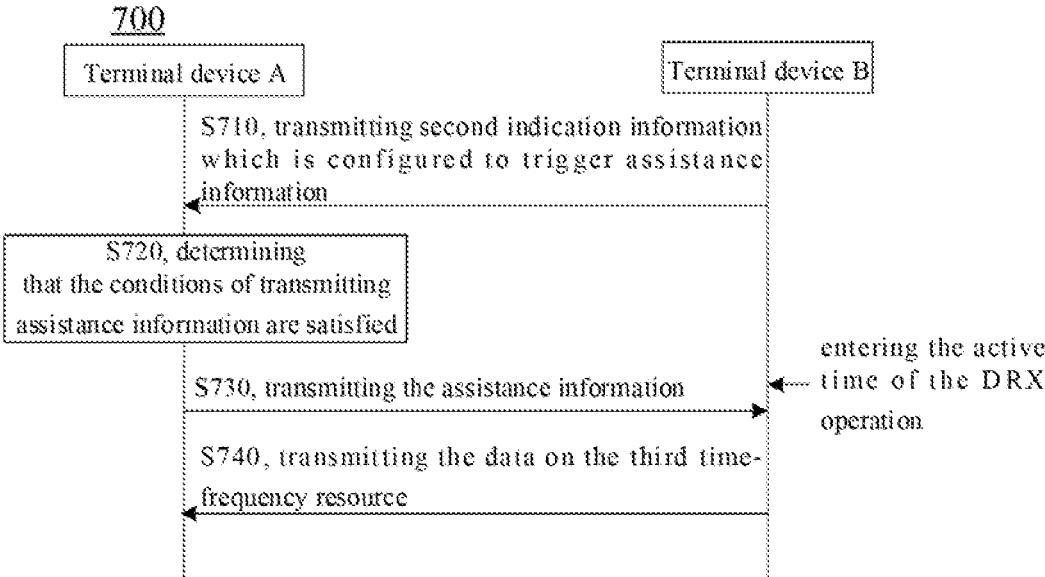

700

Terminal device A

Terminal device B

S710, transmitting second indication information which is configured to trigger assistance information S720, determining that the conditions of transmitting assistance information are satisfied entering the active time of the DRX operation S730, transmitting the assistance information S740, transmitting the data on the third time-frequency resource

FIG. 7

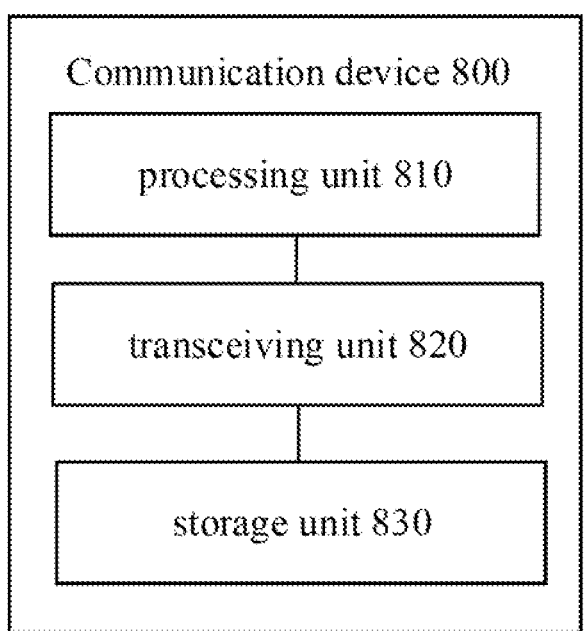

Communication device 800 processing unit 810 transceiving unit 820 storage unit 830

FIG. 8

SIDELINK COMMUNICATION METHOD AND COMMUNICATION DEVICE

CROSS REFERENCE TO RELATED APPLICATIONS

The present disclosure is a continuation of International (PCT) Patent Application No. PCT/CN2021/084688 filed on Mar. 31, 2021, the entire contents of which are hereby incorporated by reference in its entirety.

TECHNICAL FIELD

Embodiments of the present disclosure relate to a field of communications, and in particular to a sidelink communication method and a sidelink communication device.

BACKGROUND

Sidelink (SL) transmission techniques differ from a manner in traditional cellular systems in which communication data is received or transmitted through base stations, SL systems employ a terminal-to-terminal direct communication manner and therefore have higher spectral efficiencies and lower transmission delays. SL communications include two transmission modes, one is that a terminal device employs a SL resource granted by a network device to transmit data, the other is that the terminal device automatically selects a transmission resource from a pre-configured resource pool to perform a SL transmission. However, currently, a transmission manner based on the terminal device automatically selecting a resource from the pre-configured resource pool to perform SL transmission is easy to generate a problem such as a large interference and a transmission failure, and a transmission performance is still required to be improved.

SUMMARY OF THE DISCLOSURE

A sidelink communication method and a communication device are provided in the embodiments of the present disclosure.

According to a first aspect, a sidelink communication method is provided in the present disclosure and includes a first terminal device transmitting assistance information to a second terminal device in a first time interval, wherein the assistance information being configured to indicate a resource set, and the resource set includes one or more of: a resource preferred by the first terminal device, a resource not preferred by the first terminal device or a conflicting resource; wherein the first time interval is in an active time of a discontinuous reception (DRX) operation of the second terminal device.

According to a second aspect, a sidelink communication method is provided in the present disclosure and includes a second terminal device receiving assistance information from a first terminal device in a first time interval, wherein the first time interval is a time interval configured to transmit the assistance information, the assistance information is configured to indicate a resource set, and the resource set includes one or more of: a resource preferred by the first terminal device, a resource not preferred by the first terminal device or a conflicting resource; wherein the first time interval is in an active time of a discontinuous reception (DRX) operation of the second terminal device.

According to a third aspect, a communication device is also provided in some embodiments of the present disclosure and includes a processor; a memory, configured to store a computer execution instruction; an interface, configured to communicate with a terminal device; wherein the processor is configured to execute the computer execution instruction stored in the memory, to implement the sidelink communication method provided in the first aspect.

BRIEF DESCRIPTION OF THE DRAWINGS

FIG. 7 is a schematic flowchart of the SL communication method according to some embodiments of the present disclosure.

FIG. 8 is a schematic view of a communication apparatus according to some embodiments of the present disclosure.

DETAILED DESCRIPTION

Figures 1, 2:
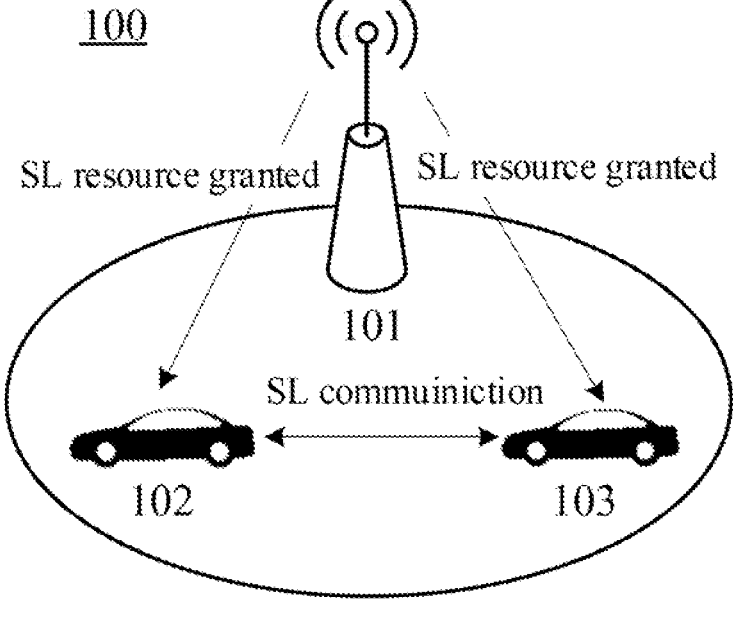
FIG. 1 is a schematic diagram applicable to a communication system of the present disclosure.
FIG. 2 is another schematic diagram applicable to the communication system of the present disclosure.

In order to make the purpose, technical schemes, and advantages of the embodiments of the present disclosure clearer, the technical schemes in the embodiments of the present disclosure are clearly and fully described in conjunction with accompanying drawings in the embodiments of the present disclosure in the following. Apparently, described embodiments are some but not all of the embodiments of the present disclosure. Other embodiments obtained by one of ordinary skill in the art based on the embodiments of the present disclosure without any creative effort fall into the scope of the present disclosure.

The terms "first", "second", etc. in the description, claims, and the above accompanying drawings of the embodiments of the present disclosure are intended to distinguish similar objects, but not to describe a particular order or a sequence. It should be understood that features with such terms may be interchangeable in appropriate cases, such that the embodiments of the present disclosure described herein may be implemented, e.g., in an order other than those illustrated or described herein. In addition, the terms "include" and "has" and any variations thereof are intended to cover non-exclusive inclusions. For example, a process, method, system, product, or device including a series of operations or units is not limited to the operations or the units clearly listed, but may also may include other operations or units not listed or inherent to the above process, method, product, or device.

The technical schemes of the embodiments of the present disclosure may be applied to various communication systems, such as a long term evolution (LTE) system, a LTE frequency division duplex (FDD) system, a LTE time division duplex (TDD) system, a universal mobile telecommunications system (UMTS), a worldwide interoperability for microwave access (WiMAX) communication system, a fifth generation (5th generation, 5G) system or a new radio (NR) system, and a future communication system (such as a sixth generation mobile communication system), which is not limited in the present disclosure.

The terminal device in some embodiments of the present disclosure may be referred to as a terminal or a user equipment (UE). The terminal device may be an access terminal, a user unit, a user station, a mobile station, a remote station, a remote terminal, a mobile device, a user terminal, a terminal device, a wireless communication device, a user agent, or a user apparatus. The terminal device may be a cellular phone, a cordless phone, a session initiation protocol (SIP) phone, a wireless local loop (WLL) station, a personal digital assistant (PDA), a handheld device with a wireless communication capability, a computing device, or other processing devices connected to a wireless modem, an in-vehicle device, a wearable device, a terminal device in a 5G network, or a terminal device in a future evolved public land mobile network (PLMN), or the like, which is not limited in the embodiments of the present disclosure.

In the embodiments of the present disclosure, the terminal device may also be the wearable device. The wearable device may also be referred to as a wearable smart device, which is a general term of wearable devices obtained by intelligently designing and developing daily wears, such as glasses, gloves, watches, clothing, and shoes, by means of wearable techniques. The wearable devices are directly worn on a body or integrated into the clothing or an accessory of the user as a portable device. The wearable devices are more than hardware devices, may also achieve powerful functions thereof through software supports, data interactions, and cloud interactions. The wearable smart device in a broad sense includes a device having full features, a large size, and capable of achieving entire or partial functions independent from a smartphone, e.g., a smart watch, or smart glasses, etc., and a device only concentrating on a particular category of application function and required to cooperate with other devices such as the smartphone, e.g., various smart bracelets configured to monitor signs, a smart jewelry, or the like. In addition, in the embodiments of the present disclosure, the terminal device may also be a terminal device in a vehicle to everything (V2X) system or an internet of things (IoT) system.

The network device in the embodiments of the present disclosure may be a device configured to communicate with the terminal device. The network device may be a base transceiver station (BTS) in a GSM or CDMA system, or a nodeB (NB) in a WCDMA system, or an evolutional nodeB (eNB or eNodeB) in the LTE system, or a radio controller in a cloud radio access network (CRAN) scenario, or may be a relay station, an access point, the in-vehicle device, and the network device in the 5G network or the network device in the future evolved PLMN network, which is not limited in the embodiments of the present disclosure.

The SL transmission techniques differ from the manner in the traditional cellular systems in which the communication data is received or transmitted through the base stations, the SL systems employ the terminal-to-terminal direct communication manner and therefore have the higher spectral efficiencies and the lower transmission delays. Two transmission modes, i.e., a mode A and a mode B are defined in a 3$^{rd}$ generation partnership project (3GPP).

Mode A: FIG. 1 is a schematic diagram of a communication system 100 employing a SL transmission mode A. As shown in FIG. 1, a SL communication resource of a terminal device 102 or a terminal device 103 is allocated by a network device 101. For example, the network device 101 grants a SL resource for the terminal device 102 through a downlink (DL), and the terminal device 102 transmits data to the terminal device 103 on this granted SL resource. Similarly, the terminal device 103 may transmit data to the terminal device 102 on a SL resource granted by the network device 101. The network device 101 may allocate a single-transmitting SL resource for the terminal device or may allocate a semi-static transmitting SL resource for the terminal device.

Mode B: FIG. 2 is a schematic diagram of a communication system 200 employing a SL transmission mode B. As shown in FIG. 2, a terminal device 202 a terminal device 203 are pre-configured with a SL resource pool. When a SL communication is required to be performed, the terminal device 202 or the terminal device 203 selects a resource from the resource pool to perform a SL data transmission.

Relevant techniques and terms involved in the present disclosure are described below.

1. A LTE Device-to-Device (D2D) Communication and a V2X Communication

In the 3GPP, the D2D communication is divided into different phases for research.

Proximity based service (ProSe): the D2D communications in a release 12 (Rel-12) standard protocol and a release 13 (Rel-13) is studied for a ProSe scenario, which is primarily oriented to a public safety business.

In the ProSe, a position of the resource pool in a time domain is configured, e.g., the resource pool being non-contiguous in the time domain, to achieve the UE non-contiguously transmit/receive the data on the SL, such that an electric power is saved.

V2X: In Rel-14/15, the V2X system studies for a vehicle-to-vehicle communication scenario, which is primarily oriented to a business of a vehicle-to-vehicle or vehicle-to-human communication with a high relative mobile speed.

In the V2X, since an in-vehicle system has a continuous power supply, a delay of a data transmission rather than a power efficiency is a primary problem. Therefore, the terminal device is required to perform a continuously transmission and reception in terms of a system design.

Further enhanced D2D (FeD2D): In Rel-14, this scenario studies for a scenario in which the wearable device accesses a network through a cell phone, which is primarily oriented to low movement speed and low-power access scenarios.

In the FeD2D, a conclusion of the 3GPP at a pre-study phase is that a base station may configure parameters of a discontinuous reception (DRX) operation of the remote terminal through a relay terminal. However, since this subject fails to further enter into a standardization phase, details of how to perform a DRX configuration has no conclusion.

2. NR V2X

The NR V2X, based on LTE V2X, is not limited to a broadcast scenario, but further expands to unicast and multicast scenarios, and the application of V2X is studied in these scenarios.

Similar to the LTE V2X, the NR V2X also defines two resource granted modes described above, i.e., a mode-1 and a mode-2. Furthermore, the user may be in a mixed mode, that is, the user may employ the mode-1 to perform a resource acquisition, and may also employ the mode-2 to perform the resource acquisition at the same time. The resource acquisition is indicated in a manner of a SL grant.

That is, the SL grant indicates time-frequency locations of resources of a corresponding physical sidelink control channel (PSCCH) and a corresponding physical sidelink shared channel (PSSCH).

Different from the LTE V2X, in addition to a hybrid automatic repeat request (HARQ) retransmission which is feedback-free and autonomously initiated by the terminal device, the NR V2X introduces a feedback-based HARQ retransmission, which is not limited to a unicast communication, but also includes a multicast communication.

3. NR-V2X Mode 2 Resource Selection Manner

In the NR-V2X, some new features, such as supporting for a large number of non-periodic services, increase in the number of retransmissions, and a more flexible resource reservation period, etc., are introduced. All these features have important influences on the mode of an autonomous resource selection of the terminal. Therefore, the 3GPP has rediscussed and redesigned a resource selection scheme applicable to the NR-V2X based on a mode-4 in the LTE-V2X, which is denoted to be the mode-2. In the mode-2, the terminal device decodes sidelink control information (SCI) transmitted by other terminal devices and measures a SL reception power to select a resource which is not reserved by other terminal devices or is reserved by other terminal devices but has a lower reception power from the resource pool. A resource selection algorithm of the NR-V2X Mode 2 may be divided into or include two primary operations, i.e., the terminal device first determines a candidate resource set and then selects a resource from the candidate resource set to transmit the data.

Operation 1: The Terminal Device Determines the Candidate Resource Set.

The terminal device takes all available resources in a resource selection window as a resource set A. First, the terminal device is required to determine whether the resource is reserved by other terminal devices based on a listening result in a resource listening window. The terminal device performs a resource exclusion based on an un-listened time slot and a listened first-stage SCI through measuring a reference signal receiving power (RSRP) of the resource. After completing the resource exclusion, the terminal device may increase a RSRP threshold by 3 dB in response to the number of remaining resources in the resource set A being less than a preset proportion, and repeat the operation 1 until the number of the remaining resources in the resource set A is greater than or equal to the preset proportion. A value of this proportion in the NR-V2X is more flexible than a fixed proportion of 20% in the LTE-V2X, which may be 20, 35, 50. A specific value of the proportion is configured or pre-configured by the network with the resource pool as a unit. Eventually, the resource set A after the resource exclusion is the candidate resource set of the terminal device.

Operation 2: The terminal device selects a transmission resource from the candidate resource set.

The terminal device randomly selects one or more transmission resources from the resource set A with an equal possibility. It is noted that the following time-domain constraints are required to be satisfied during selecting the one or more transmission resources.

First, after removing some exception situations, the terminal device is required to satisfy that a particular selected retransmission resource is able to be indicated by a first-stage SCI previously transmitted.

The above exception situations include a case in which the terminal device is unable to select a resource which satisfies this time-domain constraint from the resource set A after performing the resource exclusion. The above exception situations also include a case in which the transmission resource in a particular retransmission is not indicated by the first-stage SCI previously transmitted due to the terminal device abandoning the transmission as a result of a factor such as a resource preemption, a congestion control, and a conflict with an uplink business, or the like.

Second, the terminal device is required to ensure that for any two selected time-frequency resources, at least a duration Z in the time domain is spaced between the two resources in response to a previous transmission resource requiring a HARQ feedback.

When a resource selection fails to meet the time-domain constraints, e.g., a case in which a packet delay budget (PDB) of the business is short but the number of the retransmissions is greater, it depends on a terminal device implementation, some retransmission resources may be abandoned to select or the HARQ feedback may be activated for some specific transmissions.

4. Universal Terrestrial Radio Access Network-UE (Uu) DRX Operation

The terminal device may be configured to discontinuously monitor a physical downlink control channel (PDCCH) based on the DRX, such that the electric power may be saved. When the PDCCH carries C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI corresponding to the terminal device, the terminal device may perform a corresponding DRX operation according to control information. The network configures a series of parameters to control the DRX operation of the terminal device. These parameters include drx-onDurationTimer, drx-SlotOffset, drx-InactivityTimer, drx-Retransmission-TimerDL, drx-Retransmission-TimerUL, drx-LongCycle-StartOffset, drx-ShortCycle (optional): the Short DRX cycle, drx-ShortCycleTimer (optional), HARQ-RTT-TimerDL, drx-HARQ-RTT-TimerUL, ps-Wakeup (optional), ps-TransmitOtherPeriodicC SI (optional), ps-TransmitPeriodicL1-RSRP (optional).

The parameters mentioned above may be referred to a 3GPP standard protocol 38 series protocol.

The terminal device may be in an active time of the DRX operation in the following cases:

drx-onDurationTimer or drx-InactivityTimer running time;

drx-RetransmissionTimerDL or drx-Retransmission-TimerUL running time;

ra-ContentionResolutionTimer or msgB-ResponseWindow running time;

an unprocessed scheduling request (SR) exists therein;

PDCCH indicates a new transmission period exists therein.

In the related art, the manner of selecting the transmission resources based on a resource selection mode-2 of the SL described above may have a problem of the SL resource selected by a terminal device of a transmitting side through an interference measurement having a greater interference at the terminal device of a receiving side. For example, an interference node exists in a periphery of the terminal device of the receiving side, while the terminal device of the transmitting side cannot detect the interference node, i.e., the interference node is a hidden node for the terminal device of the transmitting side. Alternatively, when the terminal device selects a resource and transmits the data to a target terminal on the resource, the target terminal is in a transmitting state on the resource and unable to receive the data on the resource, which may lead to a mutual interference and further cause a problem such as a resource waste, a transmission delay, or the like. Regarding the problem in the mode-2 resource selection manner described above, a coordination mechanism among the terminal devices performing the SL communication (inter-UE coordination), i.e., interacting situations of SL transmission resources thereof, to reduce a possibility of a problem that a communication performance is weaken due to selecting an inappropriate transmission resource. In addition, an introduction of the SL DRX technology may render the terminal device to be in a discontinuous receiving state. The SL communication method provided in the present disclosure enables a transmission of inter-UE assistance information to happen or be performed in the active time of the DRX operation of the UE of the receiving side, which ensures the inter-UE coordination to be effectively and successfully completed. The SL communication method provided in the present disclosure is illustrated in conjunction with the accompanying drawings in the following.

Figure 3:
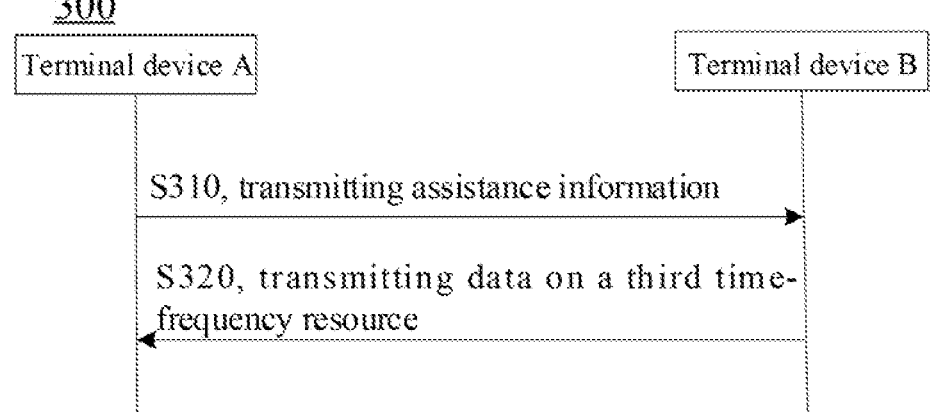
FIG. 3 is a schematic flowchart of a SL communication method according to some embodiments of the present disclosure.

FIG. 3 is a schematic flowchart of a SL communication method 300 according to some embodiments of the present disclosure. In FIG. 3A, a terminal device A communicates with a terminal device B. Before the terminal device B (i.e., an example of a second terminal device) is required to transmit the data to the terminal device A (i.e., an example of a first terminal device), the terminal device A and the terminal device B may perform a communication resource negotiation (i.e., the inter-UE coordination) through the communication method provided in the present disclosure. The SL communication method 200 shown in FIG. 3 includes, but is not limited to, the following operations.

In an operation S310, the method includes the terminal device A transmitting assistance information (AI) to the terminal device B.

Accordingly, the terminal device B receives the AI from the terminal device A.

In an embodiment, the AI is configured to indicate a resource set. The resource set includes one or more of: a resource preferred by the terminal device A and a resource not preferred by the terminal device A or a conflicting resource.

Alternatively, the resource set includes one or more of: a resource which the terminal device A prefers the terminal device B to select, a resource which the terminal device A does not prefer the terminal device B to select, or a resource detected to have a resource conflict by the terminal device A.

In an embodiment, the resource set includes a time-frequency resource which the terminal device A prefers the terminal device B to select.

For example, the terminal device A determines the resource set A based on measured interference information and/or a duplex mode (e.g., a full duplex mode, a half-duplex mode, etc.) of the terminal device A. A resource in the resource set A may be a resource detected by the terminal device A that fails to be reserved by other devices and/or a resource having a less interference and/or a resource with the terminal device A being in a receiving state. In this way, after receiving the AI, the terminal device B may prefer to select the resource in the resource set A to communicate with the terminal device A. However, the present disclosure is not limited thereto.

In another embodiment, the resource set includes a time-frequency resource which the terminal device A does not prefer the terminal device B to select.

For example, the terminal device A determines a resource set B based on the measured interference information and/or the duplex mode (e.g., the full duplex mode, the half-duplex mode, etc.) of the terminal device A. A resource in the resource set B may be a resource detected by the terminal device A that is reserved by other devices and/or a resource having a high interference, and/or a resource failing to be received due to the terminal device A being in the transmitting state. For example, the resource set B may include a time-frequency resource detected to have the conflict by the terminal device A. When the terminal device A detects a portion of a communication resource has a higher RSRP, the terminal device A determines that the communication resource has the conflict. For example, the communication resource is employed by an adjacent node for communication. The resource set B indicated by the AI includes this resource. The terminal device B is informed that this resource is not preferred to perform the communication between the terminal device A and the terminal device B. After receiving the AI, the terminal device B may prefer to select a resource other than resources in the resource set B to communicate with the terminal device A. However, the present disclosure is not limited thereto.

In another embodiment, the resource set includes both the time-frequency resource which the terminal device A prefers the terminal device B to select and the time-frequency resource which the terminal device A does not prefer the terminal device B to select.

For example, the AI transmitted by the terminal device A indicates both the resource set A preferred by the terminal device A to select and the resource set B not preferred by the terminal device A to select. When receiving the AI, the terminal device B may prefer to select resources in the resource set A to communicate with the terminal device A. When the terminal device B detects that the resources in the resource set A have large interferences on the terminal device B (e.g., the RSRP is greater than or equal to a preset threshold, etc.), the terminal device B may select a resource other than the resources in the resource set A. In this case, the resource in the resource set B which is not preferred by the terminal device A may be avoided to select to improve the reliability of the communication between the terminal device A and the terminal device B. However, the present disclosure is not limited thereto.

In some embodiments, the terminal device A transmits the AI to the terminal device B in response to satisfying conditions of transmitting the AI to the terminal device B.

For example, a resource configured to carry the AI is a periodic resource. In other words, the AI is periodic information. The terminal device A transmits the AI to the terminal device B during each period. That is, the conditions of the terminal device A transmitting the AI to the terminal device B may include the AI periodically triggers the terminal device A to transmit the AI to the terminal device B. however, the present disclosure is not limited thereto.

For another example, the terminal device A transmitting the AI to the terminal device B may be triggered by an event. For example, it may be stipulated that the terminal device A transmits the AI to the terminal device B when the terminal device A detects that a value of an interference of a predetermined number of resources is greater or less than a predetermined threshold. However, the present disclosure is not limited thereto.

In an operation S320, the method includes the terminal device B transmitting the data to the terminal device A on the third time-frequency resource.

After receiving the AI from the terminal device A, the terminal device B may determine the third time-frequency resource based on the resource set indicated by the AI and a candidate resource determined by the terminal device B, and transmit the data to the terminal device A on the third time-frequency resource in the operation S320.

For example, the terminal device B may determine the candidate resource set based on the resource selection mode-2 manner described above and refer to the resource set indicated by the AI to select the resource which is preferred by the terminal device A to select (e.g., the resource set indicated by the AI includes the resource which is preferred by the terminal device A to select) from the candidate resource set to be the third time-frequency resource. Alternatively, the third time-frequency resource is determined among remaining resources in the candidate resource set after excluding resources which are not preferred by the terminal device A to select (e.g., the resource set indicated by the AI includes the resource which is preferred by the terminal device A to select). However, the present disclosure is not limited thereto. The terminal device B may also determine the candidate resource set by other means and determine the third time-frequency resource with reference to the resource set indicated by the AI.

According to the above-mentioned scheme, the terminal devices performing the SL communication may achieve a negotiation of the resource selection through an interaction of the AI, such that a device of the transmitting side intended to select the communication resource may select a resource which has better performances in communication quality for both communication sides for communication. In this way, a communication reliability may be improved and data retransmissions may be reduced, thus a data transmission delay may be reduced.

Figure 4:
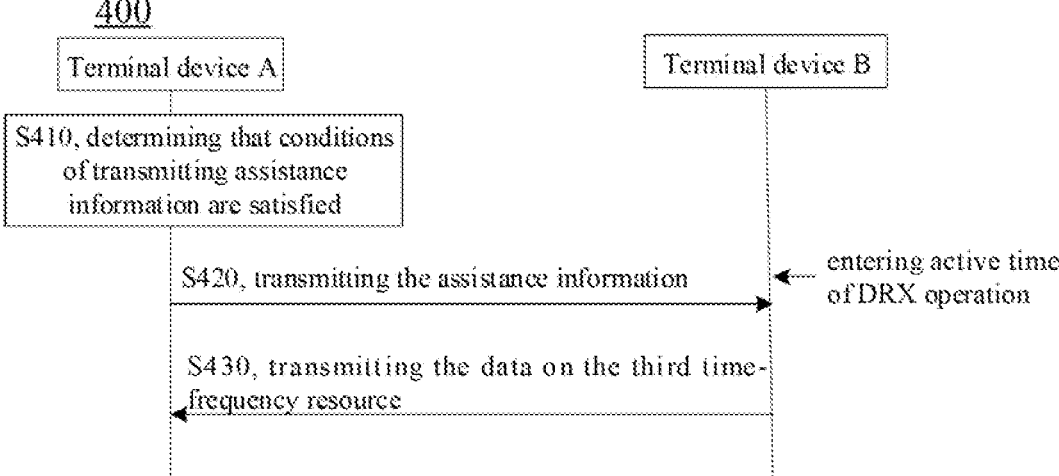
FIG. 4 is a schematic flowchart of the SL communication method according to some embodiments of the present disclosure.

FIG. 4 is a schematic flowchart of the SL communication method 400 according to some embodiments of the present disclosure. In FIG. 4, the terminal device A performs a SL communication with the terminal device B. The terminal device B is performing the DRX operation. That is, the terminal device B is configured to be in the receiving state in a time (i.e., the active time of the DRX), i.e., may receive a signal from other terminal devices in the active time of the DRX; and configured to be in a dormant state in another time (i.e., a non-active time of the DRX), i.e., may maintain a low power and stop receiving the signal from other terminal devices.

It should be noted that the terminal device performing the DRX operation may also be referred to that the terminal device is in a DRX state. The active time of the DRX operation may also be referred to an active state, and the non-active time may also be referred to a non-active state, which is not limited in the present disclosure.

Before the terminal device B (i.e., the example of the second terminal device) is required to transmit the data to the terminal device A (i.e., the example of the first terminal device), the terminal device A and the terminal device B may perform a resource negotiation through the SL communication method as shown in FIG. 4 provided in the present disclosure. The terminal device A may be configured to trigger an inter-UE coordination process. The SL communication method shown in FIG. 4 includes, but is not limited to, the following operations.

In an operation S410, the method includes the terminal device A determining that the conditions of transmitting the AI are satisfied.

In an embodiment, the conditions of the terminal device A transmitting the AI to the terminal device B include the terminal device B entering the active time of the DRX.

For example, the terminal device A determines that the terminal device B is in the active time of the DRX in a first time interval. The terminal device A determines that the conditions of transmitting the AI are satisfied in the first time interval, and determines to transmit the AI to the terminal device B in the first time interval. However, the present disclosure is not limited thereto.

In an embodiment, the terminal device A receives first configuration information. The first configuration information is configured to configure the DRX operation of the terminal device B. In other words, the first configuration information is configuration information of the DRX operation of the terminal device B.

The terminal device A may determine the active time of the DRX operation of the terminal device B based on the configuration information of the DRX operation, so as to transmit the AI to the terminal device B in the active time of the DRX operation of the terminal device B.

In an embodiment, the configuration information of the DRX operation may be configured to configure one or more of a period of the DRX operation of the terminal device B, a starting position offset, or a running duration of a timer associated with the active time of the DRX operation.

In an embodiment, the timer associated with the active time of the DRX operation of the terminal device B includes, but is not limited to, one or more of: a first timer, a second time, and a third timer.

The first timer starts to run at a starting moment of a DRX period. For example, the first timer may be written or denoted as DRX-on duration timer, which is not limited in the present disclosure.

The second timer starts to run at a moment of receiving a SL new transmission message, after receiving the SL new transmission message or after a duration since the SL new transmission message is received. For example, the second timer may be written or denoted as DRX-inactivity timer, which is not limited in the present disclosure.

A running duration of the third timer is the maximum time interval before retransmission data is received. For example, the third timer may be written or denoted as DRX-retransmission timer, which is not limited in the present disclosure.

When at least one of the first timer, the second timer, and the third timer is running, the terminal device B is in the active time of the DRX operation. The terminal device A may determine that the terminal device B is in the active time of the DRX operation based on at least one of the first timer, the second timer, and the third timer being running.

In an embodiment, the first configuration information may be provided by the terminal device B.

For example, after a SL connection is established between the terminal device A and the terminal device B, the terminal device B informs the terminal device A of the active time of the DRX operation of the terminal device B through the first configuration information. However, the present disclosure is not limited thereto.

In another embodiment, this first configuration information may be provided by the network device.

For example, the network device accessed by the terminal device A transmits the first configuration information to the terminal device A, and informs the terminal device A of the active time of the DRX operation of the terminal device B through the first configuration information. However, the present disclosure is not limited thereto.

In an embodiment, after receiving a request message requiring a reply from the terminal device B, the terminal device A determines that the terminal device B is in the active time of the DRX.

For example, the request message requiring the reply may be a channel state information (CSI) request message. When receiving the CSI request message from the terminal device B, the terminal device A may determine that the terminal device B is waiting for a CSI feedback information of the terminal device A. Therefore, the terminal device B is in the active time of the DRX operation. However, the present disclosure is not limited thereto.

In an embodiment, the terminal device B is in the active time of the DRX operation during a duration from a moment in which a request for a direct connection of transmission SL between the terminal device A and the terminal device B is established to a moment in which a SL transmission configuration is completed.

In an embodiment, the conditions of the terminal device A transmitting the AI to the terminal device B may also include a periodic condition or an event triggering condition as described in the embodiment depicted in accordance with FIG. 3.

In an operation S420, the method may include the terminal device A transmitting the AI to the terminal device B.

After determining the terminal device B is in the first time interval in the operation S410, the terminal device A may transmit the AI to the terminal device B in the first time interval. That is, the terminal device A waits for the terminal device B to be in the active state of the DRX to transmit the AI to the terminal device B. Since the terminal device B is in the active time of the DRX operation during the first time interval, i.e., the terminal device B is in the receiving state, the terminal device B accordingly receives the AI from the terminal device A.

In an operation S430, the method includes the terminal device B transmitting the data to the terminal device A on the third time-frequency resource.

The terminal device B may determine the third time-frequency resource based on the AI and the candidate resource determined by the terminal device B, and transmit the data to the terminal device A on the third time-frequency resource.

It is noted that the same or similar parts of this embodiment as in the embodiment depicted in FIG. 3 above may be referred to the description in accordance with FIG. 3 above, which is not repeated herein for brevity.

Based on the above scheme, the terminal device A determines the active time of DRX operation of the terminal device B and transmits the AI to the terminal device B in the active time, which may improve a probability of the AI being successfully received. In this way, the terminal device B may select the SL resource to communicated with the terminal device A based on the AI, such that the reliability communication may be improved.

Figure 5:
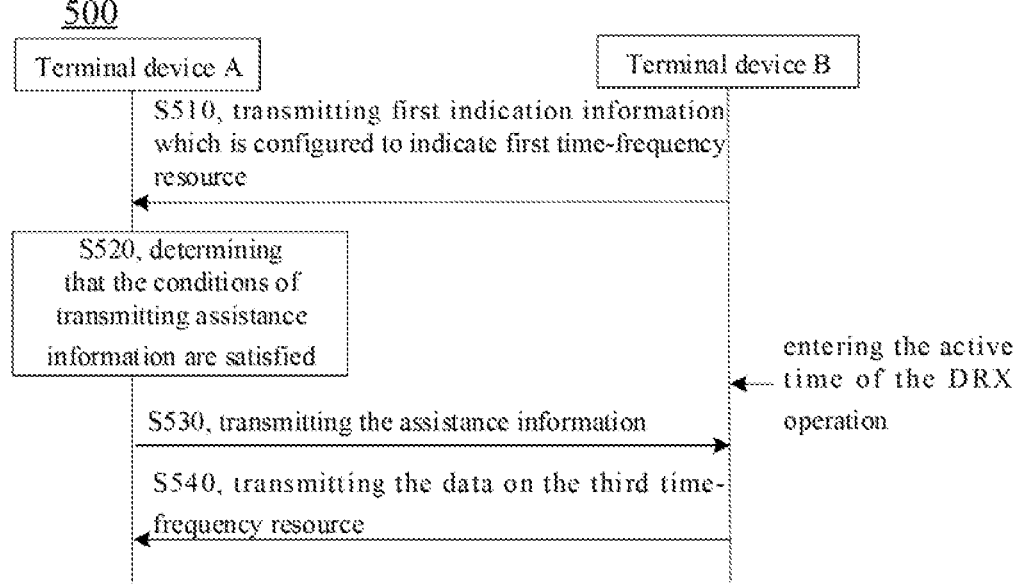
FIG. 5 is a schematic flowchart of the SL communication method according to some embodiments of the present disclosure.

FIG. 5 is a schematic flowchart of the SL communication method 500 according to some embodiments of the present disclosure. In FIG. 5, the terminal device A performs the SL communication with the terminal device B. Before the terminal device B (i.e., the example of the second terminal device) is required to transmit the data to the terminal device A (i.e., the example of the first terminal device), the inter-UE coordination process may be triggered by the terminal device A. The SL communication method shown in FIG. 5 includes, but is not limited to, the following operations.

In an operation S510, the method may include the terminal device B transmitting first indication information to the terminal device A. The first indication information is configured to indicate a first time-frequency resource.

Accordingly, the terminal device A receives the first indication information from the terminal device B. The first time-frequency resource is a reserved resource of the terminal device B, i.e., a time-frequency resource reserved by the terminal device B for carrying the data.

As an example but not a limitation, the first indication information may be the SCI.

The terminal device B informs the terminal device A of the reserved resource for carrying the data, i.e., the first time-frequency resource, through the first indication information. The terminal device A determines whether the first time-frequency resource is suitable for receiving the data.

For example, the terminal device A may receive SCI of other terminal devices (i.e., terminal devices other than the terminal device B) to determine resources reserved by other terminal devices. When the resources reserved by other terminal devices conflict with the first time-frequency resource, the terminal device A may predict a value of the interference. When the value of the interference is less than a preset threshold value, the terminal device A may determine to receive the data on the first time-frequency resource. When the value of the interference is greater than the preset threshold value, the terminal device A may trigger an inter-UE resource negotiation process, and inform the terminal device B of a preferred-to-select or un-preferred-to-select resource set. However, the present disclosure is not limited thereto.

For another example, the terminal device A is in the half-duplex mode. When the terminal device A is in the transmitting state on the first time-frequency resource, the terminal device A is unable to receive the data from the terminal device B on the first time-frequency resource. Thus, the terminal device A may trigger the inter-user resource negotiation process to inform the terminal device B of the preferred-to-select or the un-preferred-to-select resource set through the AI. However, the present disclosure is not limited thereto.

In an operation S520, the method includes the terminal device A determining that the conditions of transmitting the AI are satisfied.

The conditions of the terminal device A transmitting the AI to the terminal device B may include the terminal device A determining that the first time-frequency resource is unsuitable for receiving the data. When determining that the first time-frequency resource is unsuitable for receiving the data, the terminal device A informs the terminal device B of the preferred-to-select or the un-preferred-to-select resource set through the AI.

In an embodiment, the conditions of the terminal device A transmitting the AI to the terminal device B further include that the terminal device A may transmit the AI prior to the first time-frequency resource. That is, a time interval A of the terminal device A transmitting the AI is prior to the first time-frequency resource.

In an embodiment, a minimum time interval required by the terminal device B to perform a resource reselection is a second time interval. The conditions of the terminal device A transmitting the AI to the terminal device B further include that an interval between an ending moment of the time interval A (i.e., an example of the first time interval) and a starting moment of the first time-frequency resource is greater than or equal to the second time interval. In an embodiment, the terminal device A transmits the AI in the time interval A.

In other words, the terminal device B requires at least the second time interval to reselect a resource for carrying the data. The terminal device A is required to complete a transmission of the AI at a moment prior to and spaced greater than or equal to the second time interval from the starting moment of the first time-frequency resource. In this way, the terminal device B is allowed to have enough time to reselect the resource for carrying the data after receiving the AI.

Figure 6:
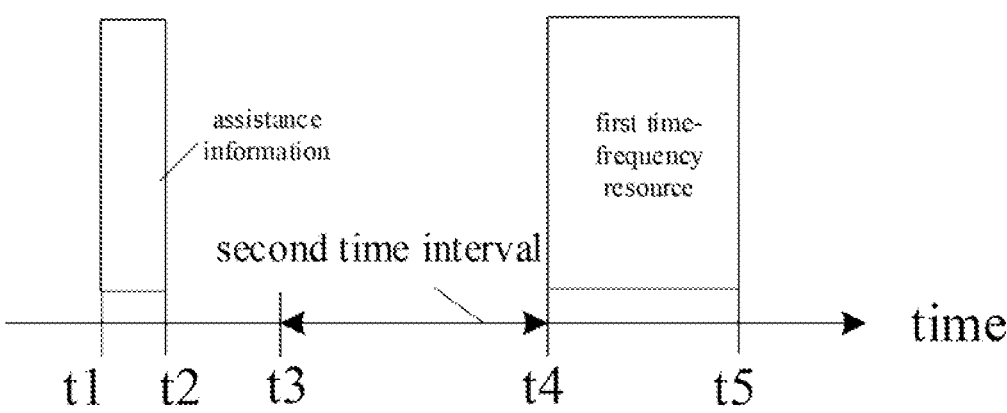
FIG. 6 is a schematic view of a time relationship between assistance information and a first time-frequency resource according to some embodiments of the present disclosure.

For example, as shown in FIG. 6, the starting moment and an ending moment of the first time-frequency resource are t4 and t5, respectively. When the terminal device A is able to transmit the AI at a moment prior to and spaced greater than or equal to the second time interval from the moment t4, i.e., a moment t3, the terminal device B is allowed to perform the resource reselection. When the terminal device A is able to transmit the AI in the time interval A which has a starting moment t1 and the ending moment t2, and the moment t2 is prior to the moment t3, i.e., t4-t2 is greater than the second time interval, the terminal device A determines that the conditions of transmitting the AI are satisfied.

In an embodiment, the terminal device B is the terminal device performing the DRX operation. It may be stipulated that the terminal device B is in the active time of the DRX operation during the time interval A. The terminal device A transmits the AI to the terminal device B during the time interval A. The interval between the ending moment of the time interval A and the starting moment of the first time-frequency resource is greater than or equal to the second time interval described above.

For example, when a duration of the second time interval is T3, a duration of the first time interval is Tx, and the starting moment of the first time-frequency resource is t1, a range of the time interval A is [t1−T3−Tx, t1−T3]. However, the present disclosure is not limited thereto.

In an operation S530, the method may include the terminal device A transmitting the AI to the terminal device B.

After determining that the conditions of transmitting the AI are satisfied in the operation S520, the terminal device A transmits the AI to the terminal device B in the time interval A.

In an operation S540, the method may include the terminal device B transmitting the data to the terminal device A on the third time-frequency resource.

The terminal device B may determine the third time-frequency resource based on the AI and the candidate resource determined by the terminal device B, and transmit the data to the terminal device A on the third time-frequency resource.

It is noted that the same or similar parts of this embodiment as in the embodiments depicted in accordance with FIG. 3 and FIG. 4 may be referred to the above description, which are not repeated herein for brevity.

FIG. 7 is a schematic flowchart of the SL communication method 700 according to some embodiments of the present disclosure. In FIG. 7, the terminal device A performs the SL communication with the terminal device B. Before the terminal device B (i.e., the example of the second terminal device) is required to transmit the data to the terminal device A (i.e., the example of the first terminal device), the inter-UE coordination process may be triggered by the terminal device B. The SL communication method shown in FIG. 7 includes, but is not limited to, the following operations.

In an operation S710, the method may include the terminal device B transmitting second indication information to the terminal device A. The second indication information is configured to trigger the terminal device A to transmit the AI.

Accordingly, the terminal device A receives the second indication information from the terminal device B. The terminal device A determines that the terminal device B triggers the terminal device A to transmit the AI based on received second indication information.

In an embodiment, the second indication information may be a specific sequence configured to trigger the AI.

For example, the second indication information may be a reference signal or a leading sequence. The terminal device A may determine that the terminal device B triggers transmitting the AI after detecting the specific sequence through a relevant detection. However, the present disclosure is not limited thereto.

In another embodiment, the second indication information may be carried in at least one of: the SCI, a physical sidelink feedback channel (PSFCH), a media access control (MAC) control element (CE), or a radio resource control (RRC) message.

In an embodiment, the second indication information includes one or more of: configuration information of a resource selection window of the terminal device B, time-delay requirement information of the AI, and configuration information of a time interval B (i.e., an example of the first time interval).

In an embodiment, the time interval B is a time interval in which the terminal device B may receive the AI. The terminal device A may transmit the AI in the time interval B.

For example, the second indication information indicates the configuration information of the resource selection window of the terminal device B. The configuration information of the resource selection window may indicate a starting moment and a duration of the resource selection window of the terminal device B, or may indicate the starting moment and an ending moment of the resource selection window of the terminal device B. After acquiring the configuration information of the resource selection window of the terminal device B through the second indication information, the terminal device A may determine the resource preferred by the terminal device A and the resource not preferred by the terminal device A or the resource detected to have the conflict. However, the present disclosure is not limited thereto. For another example, the second indication information includes the time-delay requirement information of the AI. The time-delay requirement information is configured to indicate a maximum time delay of the AI. That is, the time-delay requirement information may indicate a duration, and the duration is the maximum time delay of the AI. The terminal device A may transmit the AI prior to the maximum time delay of the AI based on the time-delay requirement information to ensure timeliness of the AI. When the terminal device A fails to transmit the AI before the maximum time delay of the AI, the terminal device A may not transmit the AI to avoid resource waste. However, the present disclosure is not limited thereto.

For a further example, the second indication information includes the configuration information of the time interval B. For example, the configuration information of the time interval B may indicate a starting moment and a duration of the time interval B, or may indicate the starting moment and an ending moment of the time interval B. The terminal device A may determine a time interval of the terminal device B receiving the AI based on the configuration information of the time interval B, so as to transmit the AI in the time interval B. In this way, the terminal device A and the terminal device B may reach a consensus on the time interval in which the AI is in, which avoids the resource waste and improves the communication reliability. However, the present disclosure is not limited thereto.

In an embodiment, the terminal device B is the terminal device performing the DRX operation. The terminal device B is in the active time of the DRX operation during the time interval B after transmitting the second indication information to receive the AI transmitted by the terminal device A.

In an embodiment, the second indication information is carried on a second time-frequency resource. A third time interval is between an ending moment of the second time-frequency resource and the starting moment of the time interval B. The third time interval is greater than or equal to a duration required by the terminal device A to process the AI.

That is, after receiving the second indication information, the terminal device A requires an additional duration to process the AI. For example, a duration required to process the AI may include, but be not limited to, time to responding to the second indication information and determining the resource set (i.e., time to determine the resources in the resource set), and/or, time to encode, and time to transmit the AI. However, the present disclosure is not limited thereto. The terminal device B may not receive the AI or not activate the DRX operation (i.e., being in the non-active time of the DRX operation) in the duration of the terminal device A processing the AI, to reduce power consumption.

As an example, but not a limitation, the duration required by the terminal device A to process the AI may be capability information of the terminal device as stipulated in a protocol. Alternatively, the terminal device A and the terminal device B may acquire the duration required by the terminal device A to process the AI through an information interaction. Alternatively, the duration required by the terminal device A to process the AI may be equal to the minimum duration of the terminal device A processing retransmitted data.

In an embodiment, a fourth time interval is between the ending moment of the second time-frequency resource and the ending moment of the time interval B. The fourth time interval is less than or equal to the maximum time delay of the AI.

For example, the terminal device B may receive the AI prior to the maximum time delay of the AI, or be in the active time of the DRX operation to receive the AI. After the maximum time delay, since the AI does not meet a time-delay requirement, the terminal device B may not receive the AI or enter the non-active time of the DRX operation to reduce the power consumption.

For another example, the ending moment of the second time-frequency resource is t2. The duration required by the terminal device A to process the AI is T4. The maximum time delay of the AI is T5. Thereby, a range of the time interval B may be [t2+T4, t2+T5]. However, the present disclosure is not limited thereto.

In an embodiment, the time interval B may be greater than or equal to a time interval between the PSSCH and the PSFCH carrying the feedback information of the PSSCH.

In an operation S720, the method may include the terminal device A transmitting the AI to the terminal device B.

In an operation S730, the method may include the terminal device B transmitting the data to the terminal device A on the third time-frequency resource.

It is noted that the same or similar parts of this embodiment as in the embodiments depicted in accordance with FIGS. 3 to 5 may be referred to the above description, which are not be repeated herein for brevity.

In the present disclosure, each of the term "time interval" and the term "duration" indicates a length of a period of time. The term "time interval" may be replaced with the term "duration", and the term "duration" may be replaced with the term "time interval", which is not limited in the present disclosure.

According to the scheme described above, the terminal devices performing the SL communication may achieve the negotiation of the resource selection through the interaction of the AI, such that the device of the transmitting side intended to select the communication resource may select the resource which has better performances in communication quality for both communication sides for communication. In this way, the communication reliability may be improved and the data retransmissions may be reduced, thus the data transmission delay may be reduced. In addition, when the terminal device is in the DRX operation, an operation of transmitting the AI to the terminal device in the active time of the DRX operation of the terminal device may improve a probability of the AI being successfully received, such that the terminal device may select the SL resource based on the AI and the communication reliability may be improved.

In the above description, the method provided in the embodiments of the present disclosure is described in detail in conjunction with FIGS. 3 to 7. The device provided by the embodiments of the present disclosure is described in the following.

FIG. 8 is a schematic block view of a communication apparatus according to some embodiments of the present disclosure. As shown in FIG. 8, the communication apparatus 800 may include a processing unit 810 and a transceiving unit 820.

In a possible design, the communication apparatus 800 may correspond to the first terminal device, i.e., the UE, in the method embodiments described above, or a chip configured in (or applied to) the first terminal device.

It should be understood that the communication apparatus 800 may correspond to the first terminal device in methods 300, 400, 500, 700 according to some embodiments of the present disclosure. The communication apparatus 800 may include units configured to perform the method performed by the first terminal device in the methods 300, 400, 500, 700 as depicted in FIGS. 3, 4, 5, and 7. Moreover, various units of the communication apparatus 800 and other operations and/or functions described above are intended to implement corresponding flows of the methods 300, 400, 500, 700 depicted in FIG. 3, FIG. 4, FIG. 5, FIG. 7, respectively.

It should also be understood that when the communication apparatus 800 is the chip configured in (or applied to) the first terminal device, the transceiving unit 820 of the communication apparatus 800 may be an input/output interface or circuit of the chip, and the processing unit 810 of the communication apparatus 800 may be a processor in the chip.

In an embodiment, the processing unit 810 of the communication apparatus 800 may be configured to process instructions or data to achieve corresponding operations.

In an embodiment, the communication apparatus 800 may also include a storage unit 830. The storage unit 830 may be configured to store the instructions or the data, and the processing unit 810 may execute the instructions or the data stored in the storage unit to enable the communication apparatus to achieve the corresponding operations. The transceiving unit 820 of the communication apparatus 800 may correspond to a transceiver 910 of a first terminal device 900 shown in FIG. 9, and the storage unit 830 may correspond to a memory in the first terminal device 900 shown in FIG. 9.

It should be understood that specific processes of various units performing the above corresponding operations have been illustrated in detail in the method embodiments described above, which are not repeated herein for brevity.

Figure 9:
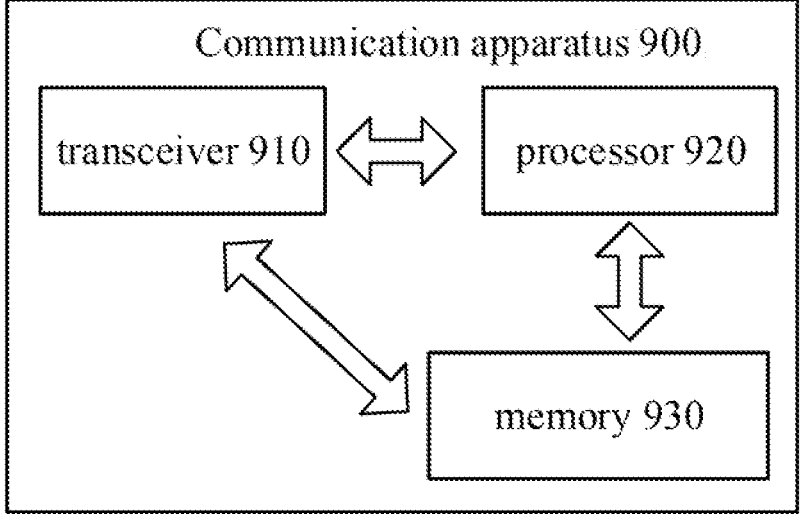
FIG. 9 is a schematic structural view of a communication device according to some embodiments of the present disclosure.

It should also be understood that when the communication apparatus 800 is the first terminal device, the transceiving unit 820 of the communication apparatus 800 may be implemented through a communication interface (such as a transceiver or the input/output interface), e.g., may correspond to the transceiver 910 of the first terminal device 900 shown in FIG. 9. The processing unit 810 of the communication apparatus 800 may be implemented through at least one processor, e.g., may correspond to a processor 920 of the first terminal device 900 shown in FIG. 9. The processing unit 810 of the communication apparatus 800 may be implemented by at least one logic circuit.

In another possible design, the communication apparatus 800 may correspond to the second terminal device in the above method embodiments, i.e., the UE, or a chip configured in (or applied to) the second terminal device.

It should be understood that the communication apparatus 800 may correspond to the second terminal device in methods 300, 400, 500, 700 according to some embodiments of the present disclosure. The communication apparatus 800 may include units configured to perform the method performed by the second terminal device in the methods 300, 400, 500, 700 as depicted in FIGS. 3, 4, 5, and 7. Moreover, the various units of the communication apparatus 800 and other operations and/or functions described above are intended to implement corresponding flows of the methods 300, 400, 500, 700 depicted in FIG. 3, FIG. 4, FIG. 5, FIG. 7, respectively.

It should also be understood that when the communication apparatus 800 is the chip configured in (or applied to) the second terminal device, the transceiving unit 820 of the communication apparatus 800 may be an input/output interface or circuit of the chip, and the processing unit 810 of the communication apparatus 800 may be the processor in the chip.

In an embodiment, the processing unit 810 of the communication apparatus 800 may be configured to process instructions or data to achieve corresponding operations.

In an embodiment, the communication apparatus 800 may also include the storage unit 830. The storage unit 830 may be configured to store the instructions or the data, and the processing unit 810 may execute the instructions or the data stored in the storage unit to enable the communication apparatus to achieve the corresponding operations. The transceiving unit 820 of the communication apparatus 800 may correspond to the transceiver 910 of the second terminal device 900 shown in FIG. 9, and the storage unit 830 may correspond to a memory in second terminal device 900 shown in FIG. 9.

It should be understood that the specific processes of the various units performing the above corresponding operations have been illustrated in detail, which are not repeated herein for brevity.

It should also be understood that when the communication apparatus 800 is the second terminal device, the transceiving unit 820 of the communication apparatus 800 may be implemented through the communication interface (such as the transceiver or the input/output interface), e.g., may correspond to the transceiver 910 of the second terminal device 900 shown in FIG. 9. The processing unit 810 of the communication apparatus 800 may be implemented through at least one processor, e.g., may correspond to the processor 920 of the second terminal device 900 shown in FIG. 9. The processing unit 810 of the communication apparatus 800 may be implemented by at least one logic circuit.

FIG. 9 is a schematic structural view of a communication device 900 according to some embodiments of the present disclosure. The terminal device 900 may be performed in systems as shown in FIGS. 1 and 2 and perform functions of the first terminal device or the second terminal device in the method embodiments described above. As shown in FIG. 9, the terminal device 900 includes the processor 920 and the transceiver 910. In an embodiment, the terminal device 900 further includes a memory 930. The processor 920, the transceiver 910, and the memory may communicate with each other via an internal connection path to transmit a control and/or data signal. The memory is configured to store a computer program, and the processor 920 is configured to execute the computer program in the memory to control the transceiver 910 to transmit and receive signals.

The processor 920 described above and the memory may be integrated into a processing device. The processor 920 is configured to execute program codes stored in the memory to achieve the above functions. During a specific implementation, the memory may also be integrated in the processor 920 or be independent from the processor 920. The processor 920 may correspond to the processing unit in FIG. 8.

The transceiver 910 described above may correspond to the transceiving unit in FIG. 8. The transceiver 910 may include a receiver (or a receiving machine, a receiving circuit) and a transmitter (or a transmitting machine, a transmitting circuit). The receiver is configured to receive a signal and the transmitter is configured to transmit a signal.

It should be understood that the terminal device 900 shown in FIG. 9 is capable of implementing each process of the terminal device involved in the embodiments of the methods 300, 400, 500, 700 respectively depicted in FIGS. 3, 4, 5, and 7. An operation and/or a function of each module in the terminal device 900 is configured to implement a corresponding process in the method embodiments described above, which may be referred to the description of the method embodiments described above. A detailed description is appropriately omitted herein to avoid repetition.

The processor 920 described above may be configured to perform actions implemented inside the terminal device as described in the foregoing method embodiments. The transceiver 910 may be configured to perform an action of the terminal device transmitting to or receiving from the network device as described in the foregoing method embodiments. Details may be referred to the description of the foregoing method embodiments, which are not repeated herein.

In an embodiment, the terminal device 900 mentioned above may also include a power supply. The power supply is configured to provide power to various components or circuits in the terminal device.

A processing device is also provided in some embodiments of the present disclosure and includes a processor and an interface. The processor is configured to perform the method in any of the method embodiments described above.

It should be understood that the processing device described above may be one or more chips. For example, the processing device may be a field programmable gate array (FPGA), an application specific integrated circuit (ASIC), a system on chip (SoC), a central processing unit (CPU), a network processor (NP), a digital signal processor (DSP), a micro controller unit (MCU), a programmable logic device (PLD), or other integrated chips.

In a process of implementation, each operation of the method described above may be accomplished by an integrated logic circuit of a hardware in the processor or by instructions in a form of a software. The operations of the method disclosed in conjunction with the embodiments of the present disclosure may be directly embodied to be implemented by a hardware processor, or by a combination of a hardware module and a software module in the processor. The software module may be arranged in a mature medium in the art such as a random memory, a flash memory, a read-only memory, a programmable read-only memory or an electrically rewritable programmable memory, a register or the like. The storage medium is arranged in the memory. The processor reads the information in the memory and accomplishes the operations of the method described above in combination with the hardware thereof. Detailed description is omitted to avoid repetition.

It should be noted that the processor in the embodiments of the present disclosure may be an integrated circuit chip with a processing capability for signals. During the process of implementation, each operation in the method embodiments described above may be accomplished by the integrated logic circuit of the hardware in the processor or by the instructions in the form of the software. The processor described above may be a general-purpose processor, the DSP, the ASIC, the FPGA or other programmable logic components, a discrete gate or a transistor logic component, or a discrete hardware component. The processor may implement or perform each method, operation, or logic block diagram disclosed in the embodiments of the present disclosure. The general-purpose processor may be a microprocessor. Alternatively, the processor may also be any conventional processor. The operations of the method disclosed in conjunction with the embodiments of the present disclosure may be directly embodied to be implemented by a hardware decode processor or by a combination of a hardware module and a software module in the decode processor. The software module may be arranged in the mature medium in the art such as the random memory, the flash memory, the read-only memory, the programmable read-only memory or the electrically rewritable programmable memory, the register, or the like. The storage medium is arranged in the memory. The processor reads the information in the memory and accomplishes the operations of the method described above in combination with the hardware thereof.

According to the method provided in some embodiments of the present disclosure, a computer program product is also provided in the present disclosure. The computer program product includes computer program codes. When the computer program codes are executed by one or more processors, a device including the one or more processors is caused to perform the method in the above embodiments.

According to the method provided in some embodiments of the present disclosure, a computer-readable storage medium is also provided in the present disclosure and includes program codes. When the program codes are run by the one or more processors, a device including the one of more processors is caused to perform the method in the above embodiments.

According to the method provided in some embodiments of the present disclosure, a system is also provided in the present disclosure and includes one or more of network devices described above. The system may further include one or more of terminal devices described above.

In some embodiments provided in the present disclosure, it should be understood that the device and method disclosed therein may be implemented in other ways. For example, device embodiments described above are merely schematic. For instance, a division of modules is only a logical functional division, and other division manners are allowed during actual implementations. For example, multiple modules may be combined or integrated into another system, or some features may be ignored or not implemented. In addition, a mutual coupling or a direct coupling or a communication connection shown or discussed may be implemented through some interfaces. An indirect coupling or the communication connection among the modules may be electrical, mechanical, or of other forms.

The above description is only specific implementations of the present disclosure, but the scope of the present disclosure is not limited thereto. Any variation or substitution easily anticipated by a person of ordinary skill in the art within the technical scope disclosed by the present disclosure shall fall into the scope of the present disclosure. Therefore, the scope of the present disclosure shall be subject to the scope of the claims.

What is claimed is:

1. A sidelink communication method, comprising:
transmitting, by a first terminal device, assistance information to a second terminal device in a first time interval, wherein the assistance information is configured to indicate a resource set, and the resource set comprises one or more of:
a resource preferred by the first terminal device,
a resource not preferred by the first terminal device or a conflicting resource;
wherein the first time interval is in an active time of a discontinuous reception (DRX) operation of the second terminal device,
wherein the method further comprises;
receiving, by the first terminal device, first indication information from the second terminal device, wherein the first indication information is configured to indicate a first time-frequency resource, and the first time-frequency resource is a reserved resource of the second terminal device;
wherein the first time interval is prior to the first time-frequency resource,
wherein an interval between an ending moment of the first time interval and a starting moment of the first time-frequency resource is greater than or equal to a second time interval, and the second time interval is a minimum time interval required by the second terminal device to perform a resource reselection.

2. The method according to claim 1, further comprising:
receiving, by the first terminal device first configuration information, wherein the first configuration information is to configure the DRX operation configuration; and
determining, by the first terminal device, the active time of the DRX operation based on the first configuration information.

3. The method according to claim 1, further comprising:
determining, by the first terminal device, to transmit the assistance information to the second terminal device based on the first time-frequency resource.

4. The method according to claim 1, further comprising:
receiving, by the first terminal device, second indication information from the second terminal device,
wherein the second indication information is configured to trigger the first terminal device to transmit the assistance information.

5. The method according to claim 4, wherein the second indication information comprises one or more of:
configuration information of a resource selection window of the second terminal device, time-delay requirement information of the assistance information, and configuration information of the first time interval.

6. The method according to claim 4, wherein the second indication information is carried on a second time-frequency resource, a third time interval is between an ending moment of the second time-frequency resource and a starting moment of the first time interval, and the third time interval is greater than or equal to a duration required by the first terminal device to process the assistance information, and/or a fourth time interval is between an ending moment of the second time-frequency resource and the ending moment of the first time interval, and the fourth time interval is less than or equal to a maximum time delay of the assistance information.

7. The method according to claim 4, wherein the second indication information is carried in at least one of:

sidelink control information (SCI), a physical sidelink feedback channel (PSFCH), and a medium access control (MAC) control element CE or a radio resource control (RRC) message.

8. The method according to claim 1, further comprising:

receiving, by the first terminal device, data from the second terminal device on a third time-frequency resource;

wherein the third time-frequency resource is determined by the second the terminal device based on the resource set.

9. A sidelink communication method, comprising:

receiving, by a second terminal device, assistance information from a first terminal device in a first time interval, wherein the first time interval is a time interval configured to transmit the assistance information, the assistance information is configured to indicate a resource set, and the resource set comprises one or more of:

a resource preferred by the first terminal device, a resource not preferred by the first terminal device or a conflicting resource;

wherein the first time interval is in an active time of a discontinuous reception (DRX) operation of the second terminal device, wherein the method further comprises:

transmitting, by the second terminal device, first indication information to the first terminal device, wherein the first indication information is configured to indicate a first time-frequency resource, and the first time-frequency resource is a reserved resource of the second terminal device;

wherein the first time interval is prior to the first time-frequency resource, wherein an interval between an ending moment of the first time interval and a starting moment of the first time-frequency resource is greater than or equal to a second time interval, and the second time interval is a minimum time interval required by the second terminal device to perform a resource reselection.

10. The method according to claim 9, further comprising:

transmitting, by the second terminal device, second indication information to the first terminal device, wherein the second indication information is configured to trigger the first terminal device to transmit the assistance information.

11. The method according to claim 10, wherein the second indication information comprises one or more of:

configuration information of a resource selection window of the second terminal device, time-delay requirement information of the assistance information, and configuration information of the first time interval.

12. The method according to claim 10, wherein the second indication information is carried on a second time-frequency resource, a third time interval is between an ending moment of the second time-frequency resource and a starting moment of the first time interval, and the third time interval is greater than or equal to a duration required by the first terminal device to process the assistance information, and/or a fourth time interval is between an ending moment of the second time-frequency resource and the ending moment of the first time interval, and the fourth time interval is less than or equal to a maximum time delay of the assistance information.

13. The method according to claim 10, wherein the second indication information is carried in at least one of:

SCI, a PSFCH, and a MAC CE or a RRC message.

14. A communication device, the communication device being a first terminal device and comprising:

a processor;

a memory, configured to store a computer execution instruction;

an interface, configured to communicate with a second terminal device;

wherein the processor is configured to execute the computer execution instruction stored in the memory, to implement:

transmitting assistance information to the second terminal device in a first time interval, wherein the assistance information is configured to indicate a resource set, and the resource set comprises one or more of:

a resource preferred by the first terminal device, a resource not preferred by the first terminal device or a conflicting resource;

wherein the first time interval is in an active time of a discontinuous reception (DRX) operation of the second terminal device, wherein the processor is further configured to execute the computer execution instruction stored in the memory, to implement:

receiving first indication information from the second terminal device, wherein the first indication information is configured to indicate a first time-frequency resource, and the first time-frequency resource is a reserved resource of the second terminal device;

wherein the first time interval is prior to the first time-frequency resource, wherein an interval between an ending moment of the first time interval and a starting moment of the first time-frequency resource is greater than or equal to a second time interval, and the second time interval is a minimum time interval required by the second terminal device to perform a resource reselection.

15. The communication device according to claim 14, wherein the processor is further configured to implement:

receiving second indication information from the second terminal device, wherein the second indication information is configured to trigger the first terminal device to transmit the assistance information.

16. The communication device according to claim 15, wherein the second indication information comprises one or more of:

configuration information of a resource selection window of the second terminal device, time-delay requirement information of the assistance information, and configuration information of the first time interval.

17. The communication device according to claim 15, wherein the second indication information is carried on a second time-frequency resource, a third time interval is between an ending moment of the second time-frequency resource and a starting moment of the first time interval, and the third time interval is greater than or equal to a duration required by the first terminal device to process the assistance information, and/or a fourth time interval is between an ending moment of the second time-frequency resource and the ending moment of the first time interval, and the fourth time interval is less than or equal to a maximum time delay of the assistance information.

18. The communication device according to claim 15, wherein the second indication information is carried in at least one of:

SCI, a PSFCH, and a MAC control element CE or a RRC message.

* * * * *